US006669302B2

(12) United States Patent
Warner, Jr. et al.

(10) Patent No.: US 6,669,302 B2
(45) Date of Patent: Dec. 30, 2003

(54) SEAT BELT POSITION ADJUSTING ARRANGEMENT FOR A VEHICLE SEAT

(75) Inventors: Robert J. Warner, Jr., Akron, OH (US); Alan W. Eastman, Medina, OH (US)

(73) Assignee: Graco Children's Products Inc., Exton, PA (US)

( * ) Notice: Subject to any disclaimer, the term of this patent is extended or adjusted under 35 U.S.C. 154(b) by 13 days.

(21) Appl. No.: 09/850,196

(22) Filed: May 8, 2001

(65) Prior Publication Data

US 2002/0167213 A1 Nov. 14, 2002

(51) Int. Cl.$^7$ .............................................. B60R 22/30
(52) U.S. Cl. ..................................... 297/483; 297/250.1
(58) Field of Search ............................... 297/483, 250.1; 280/801.1, 801.2

(56) References Cited

U.S. PATENT DOCUMENTS

| 4,652,053 A | | 3/1987 | Mikami |
| 4,796,919 A | * | 1/1989 | Linden ........................ 297/483 |
| 5,358,310 A | | 10/1994 | Nemoto |
| 5,609,367 A | | 3/1997 | Eusebi et al. |
| 5,722,731 A | * | 3/1998 | Chang ..................... 297/483 X |
| 5,733,004 A | * | 3/1998 | Celestina-Krevh et al. ................. 297/250.1 X |
| 5,931,503 A | * | 8/1999 | Glendon ...................... 297/483 |
| 5,971,490 A | | 10/1999 | Chang |
| 6,079,780 A | * | 6/2000 | Bapst ................... 297/250.1 X |

FOREIGN PATENT DOCUMENTS

| EP | 0 589 071 A1 | 3/1994 |
| EP | 0 681 940 A2 | 11/1995 |
| EP | 0728638 A1 | 8/1996 |
| EP | 0 781 685 A1 | 7/1997 |
| FR | 2 123 701 | 9/1972 |
| JP | 61 071251 A | 4/1986 |

\* cited by examiner

Primary Examiner—Anthony D. Barfield
(74) Attorney, Agent, or Firm—Foley & Lardner

(57) ABSTRACT

A seat belt position adjusting arrangement for a seat having a backrest has a mounting bracket adapted to fixedly secured to an upper portion of the backrest, and a belt receiving member which is adapted to threadedly receive a shoulder belt of a vehicle seat belt. The belt receiving member is operatively connected to the mounting bracket, selectively slidable along the mounting bracket and locatable in a selected position on the mounting bracket.

11 Claims, 5 Drawing Sheets

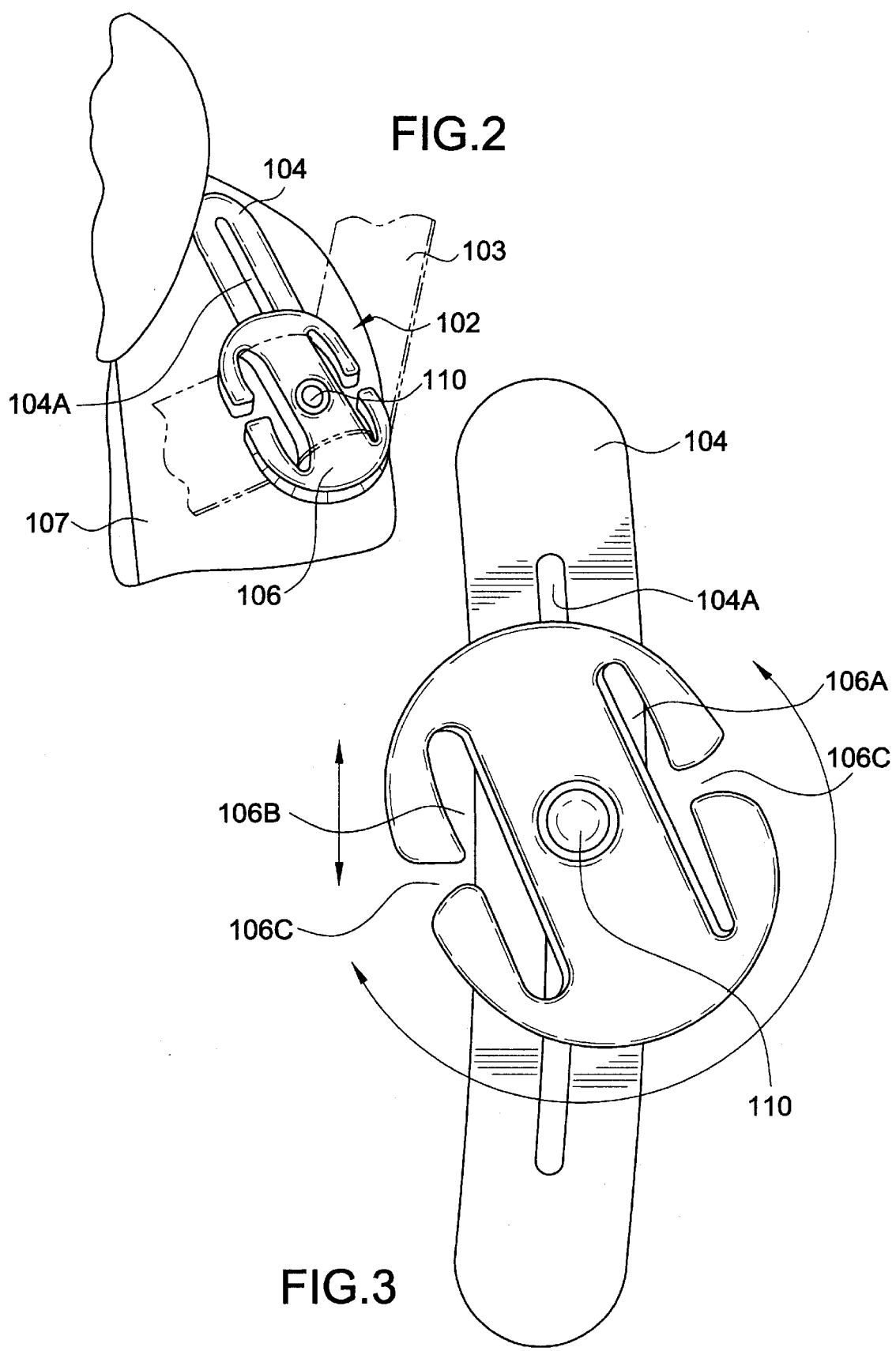

US 6,669,302 B2

SEAT BELT POSITION ADJUSTING ARRANGEMENT FOR A VEHICLE SEAT

BACKGROUND

Child car seats, also known as child restraint seats, are provided in many sizes and configurations. Generally, conventional car seats tend to be "grown out of" in relatively short periods and, thus, need to be adjusted or replaced at various stages of the physical development of the child. During this growth process, even though a five point seat belt harness, which is usually provided with such a seat, is adjustable with the size of the child, a time comes when the child has become sufficiently large that it is preferable to secure the child in position also with the shoulder belt of an adult seat belt arrangement provided in the vehicle.

When the child is secured to the seat with the shoulder belt, the belt should not pass over the face, neck or throat of the child. In this regard, a belt positioning arrangement to appropriately locate the shoulder belt relative to a particular seat occupant would be readily accepted in the market place.

SUMMARY OF THE INVENTION

The present invention is directed to providing a seat belt positioning arrangement that can enable a vehicle shoulder belt to be adjusted quickly and easily to an angle and a height where it will comfortably extend over the upper torso of a passenger secured in a seat by the same. More specifically, the invention is directed to a seat belt positioning arrangement that enables the angle and the height of a shoulder belt to be adjusted to avoid contact with the face, neck or throat of a secured passenger.

In this regard, the present invention relates to a seat belt position adjusting arrangement for a seat having a backrest. The seat belt position adjusting arrangement comprises a mounting bracket adapted to be fixedly secured to an upper portion of the back rest. The arrangement also comprises a belt receiving member that is adapted to threadedly receive a shoulder belt of the seat belt arrangement. The belt receiving member is operatively connected to the bracket, selectively slidable along the mounting bracket, and locatable in a selected position on the mounting bracket.

In this arrangement, the belt receiving member can be formed with first and second elongate belt slots through which the shoulder belt can be passed. The first belt slot can be narrower than the second belt slot, and each of the first and second belt slots can have an opening via which the shoulder belt can be introduced into the belt slots. Additionally, the mounting bracket can have a guide slot, and the belt receiving member can have a shaft which passes through the guide slot, where the shaft is adapted, such as by its cross-sectional shape, to be rotatable through a predetermined angle with respect to the guide slot and slidable along the guide slot.

The above seat belt position adjusting arrangement further can comprise a locating mechanism for locating and holding the shaft in the slot in a selected one of a predetermined plurality of spaced positions. This locating mechanism can comprise at least one pair of opposed detents projecting into the guide slot.

A second aspect of the present invention resides in a method of adjusting the position of a seat belt across a seat, comprising: passing the seat belt through slots formed in a belt receiving member; moving the belt receiving member a mounting bracket fixed to a frame member of the seat backrest; and setting the belt receiving member in a selected one of a plurality of detent positions, wherein the belt angle and height meets individual securing requirements.

A third aspect of the present invention resides in a child's seat for use in a vehicle having at least one shoulder seat belt. The child's seat comprises a seat portion, a backrest, and a seat belt position adjusting arrangement provided on an upper portion of the seat backrest. The seat belt position adjusting arrangement comprises a mounting bracket fixedly secured to the backrest and a belt receiving member. The belt receiving member is adapted to threadedly receive a shoulder seat belt, the belt receiving clip member being operatively connected to the bracket so as be selectively movable therealong. This arrangement also can include a locating arrangement for locating and holding the belt receiving member in a selected position on the mounting bracket.

In an embodiment according to this aspect of the invention, the locating arrangement can comprise at least one pair of opposed detents formed on the mounting bracket to engage a portion of the belt receiving member and resist movement of the belt receiving member therepast until a predetermined amount of force is applied in a direction in which the belt receiving member moves along the mounting bracket.

BRIEF DESCRIPTION OF THE DRAWINGS

The various features, aspects, and attendant advantages of the present invention will become more apparent from the following description, appended claims, and accompanying exemplary embodiment(s) shown in the drawings, wherein:

FIG. 2 is a perspective view of one of the seat belt position adjusting arrangements shown in FIG. 1;

FIG. 3 is a top plan view of a bracket and a belt receiving member of the seat belt position adjusting arrangement according to a first embodiment of the invention;

DETAILED DESCRIPTION

Figure 1:
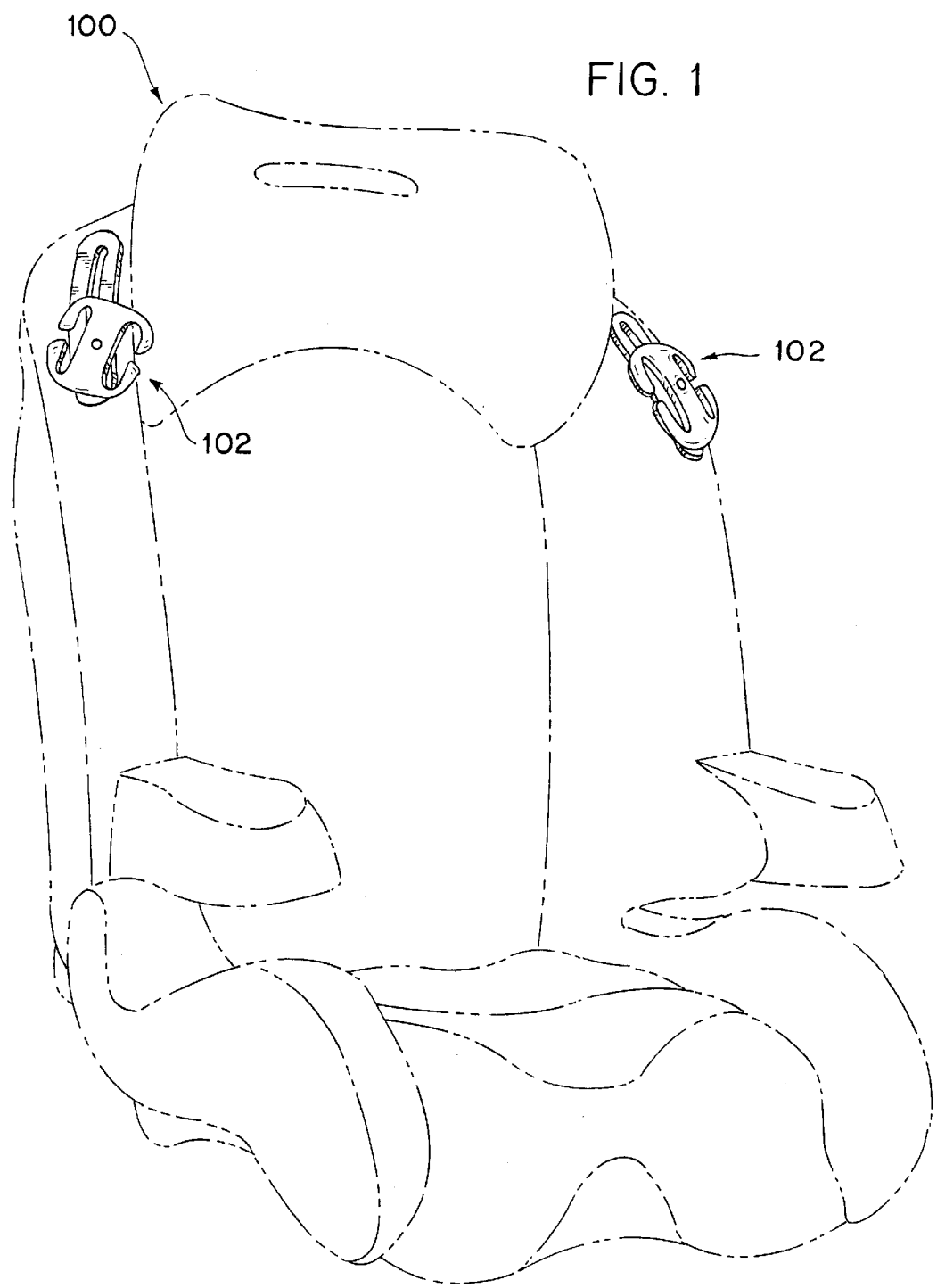
FIG. 1 is a perspective view showing a child's car seat which is equipped with a pair of seat belt position adjusting arrangements in accordance with the invention.

Referring to the figures, FIG. 1 shows a seat belt position adjusting arrangement 102 secured to a child car seat 100. The seat belt position adjusting arrangement of the present invention allows a user to adjust a vehicle shoulder belt quickly and easily to an angle and a height where it will comfortably extend over the upper torso of a passenger secured in the seat by the same. In order to permit adjustment of the belt angle and the belt height, the arrangement 100 generally includes a mounting bracket fixedly secured to an upper portion of the backrest of the seat and a belt receiving member connected to the mounting bracket. The shoulder belt can be passed through one or more pairs of openings formed in the belt receiving member, and the belt receiving member can be moved along the mounting bracket to a desired position, where the shoulder belt is comfortably and appropriately disposed over the passenger's thorax/upper body and not across the passenger's face, neck, or throat.

FIG. 1 shows a child's car seat 100 equipped with two seat belt position adjusting arrangements 102 according to the present invention. Each of the seat belt position adjusting arrangements 102 is arranged, as shown in FIG. 2, to receive a shoulder belt 103 of an adult seat belt arrangement and to enable adjustment of the angle and height at which the shoulder belt 103 passes across the front of a seated occupant. The provision of the seat belt position adjusting arrangements 102 on both shoulder portions of the backrest of the car seat 100, in the manner illustrated in FIG. 1, allows the seat 100 to be disposed on either the left or the right side of the vehicle. The child's car seat 100 also can be fitted with a child seat harness (not shown) or the like, such as that disclosed in co-pending U.S. patent application Ser. No. 09/167,893, the disclosure of which is incorporated by reference herein.

Figure 4:
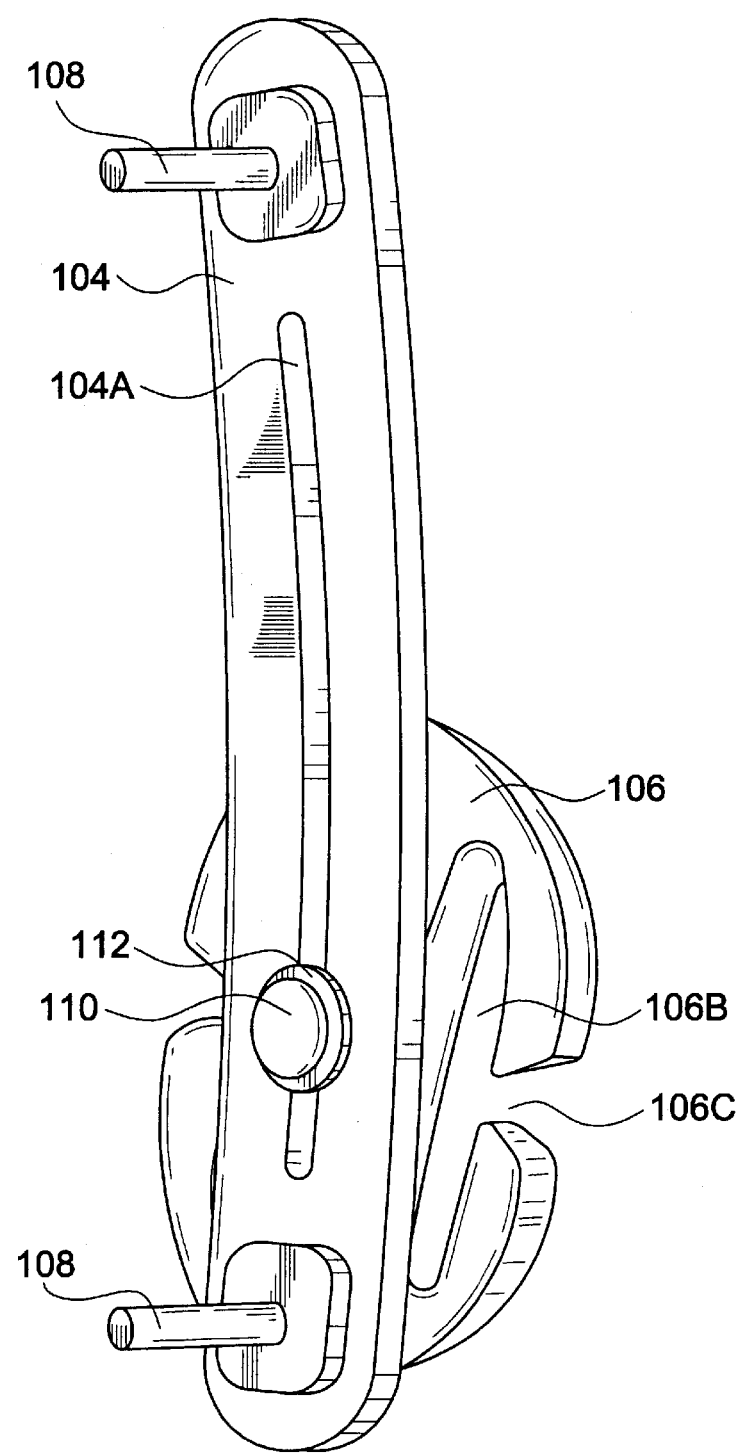
FIG. 4 is a rear perspective view of the bracket member and the belt receiving member, showing studs used to mount the bracket member to a frame of a backrest.

As shown in FIGS. 3 and 4, the seat belt position adjusting arrangement 102 includes a mounting bracket 104 and a seat belt receiving member or clip 106. The mounting bracket 104 is arranged to be set on and fixedly secured to the shell body of the car seat 100. As shown in FIG. 4, the mounting bracket 104 is provided with two studs 108 that are adapted to be received in bores or suitable apertures formed in the backrest 107 of the car seat. In this regard, the car seat 100 generally includes soft padding that covers a shell body, and the studs 108 pass through apertures in the soft padding and then through apertures in the shell body underneath the padding. The studs 108 can be fixed in position to the backrest 107 (in particular, to the back surface of the shell body backrest) using any number of conventional securing techniques, such as bonding, welding, providing threads on the terminal ends of the studs 108 to which nuts can be secured, etc.

The belt receiving member 106 includes a shaft 110 that passes through an elongate guide slot 104A formed in the bracket 104. The shaft 110 is fastened to the bracket 104 to resist axial displacement, for example, by riveting the end of the shaft 110 against a washer 112. It will be noted that riveting is not the only form of connection which can be used, and any other suitable form of connection, such as the use of split pins, screws, welding, nuts or the like that will provide a secure connection, can also be used to secure the shaft 110 to the bracket 104.

The belt receiving member 106 is formed with two essentially parallel belt slots 106A, 106B. As shown, these slots 106A, 106B have different widths, wherein the first 106A is narrower than the second 106B. Openings 106C are formed in the belt receiving member 106 in order to facilitate the introduction of the shoulder belt into slots 106A, 106B. The wider slot 106B is generally oriented toward the front of the car seat 100, and the narrower slot 106A is generally oriented toward the back of the child seat 100. The shoulder belt 103 can be passed through both slots 106A, 106B to lock the belt 103 in place. Alternatively, the belt 103 can be passed through only the wider slot 106B to allow the child to move more freely. This alternative belting arrangement is preferable for an older child who may desire greater freedom of movement. While the shape of the belt receiving member 106 is not limited, the belt receiving member 106 in this embodiment is oval in shape and is provided with chamfered/smoothly curved edges.

The belt receiving member 106 can rotate relative to the mounting bracket 104 about the shaft 110 through a predetermined rotational angle, as shown in FIG. 3. In this regard, the shaft 110 is configured to have a cross-section which limits the amount of rotation of the shaft 110 within the slot 104A to the predetermined rotational angle. In one embodiment, for example, the shaft 110 can be configured to permit the belt receiving member 106 to rotate from a rest position (where slots 106A, 106B are generally aligned with slot 104A) through an angle of about 10°.

In addition to being rotatable relative to the mounting bracket 106, the belt receiving member 106 is selectively slidable along the mounting bracket 104. In particular, the belt receiving member 106 can slide along slot 104A to a selected position on the mounting bracket 104 so that the height of a shoulder belt threaded through the belt receiving member 106 meets individual securing requirements. As mentioned above, the shoulder belt should not pass in front of the passenger's head, neck, or throat. For taller children, for example, the belt receiving member 106 can be located at a high position along the slot 104, closer to the head rest of the car seat 100, and, for smaller children, the belt receiving member 106 can be located at a lower position along the slot 104, closer to the seat portion of the car seat 100.

The belt receiving member 106 thus can be rotated about shaft 110 to achieve a preferred belt angle, and can be slid along slot 104A to achieve a preferred belt height, in accordance with the individual securing requirements of children seated in the child seat 100.

Figure 5:
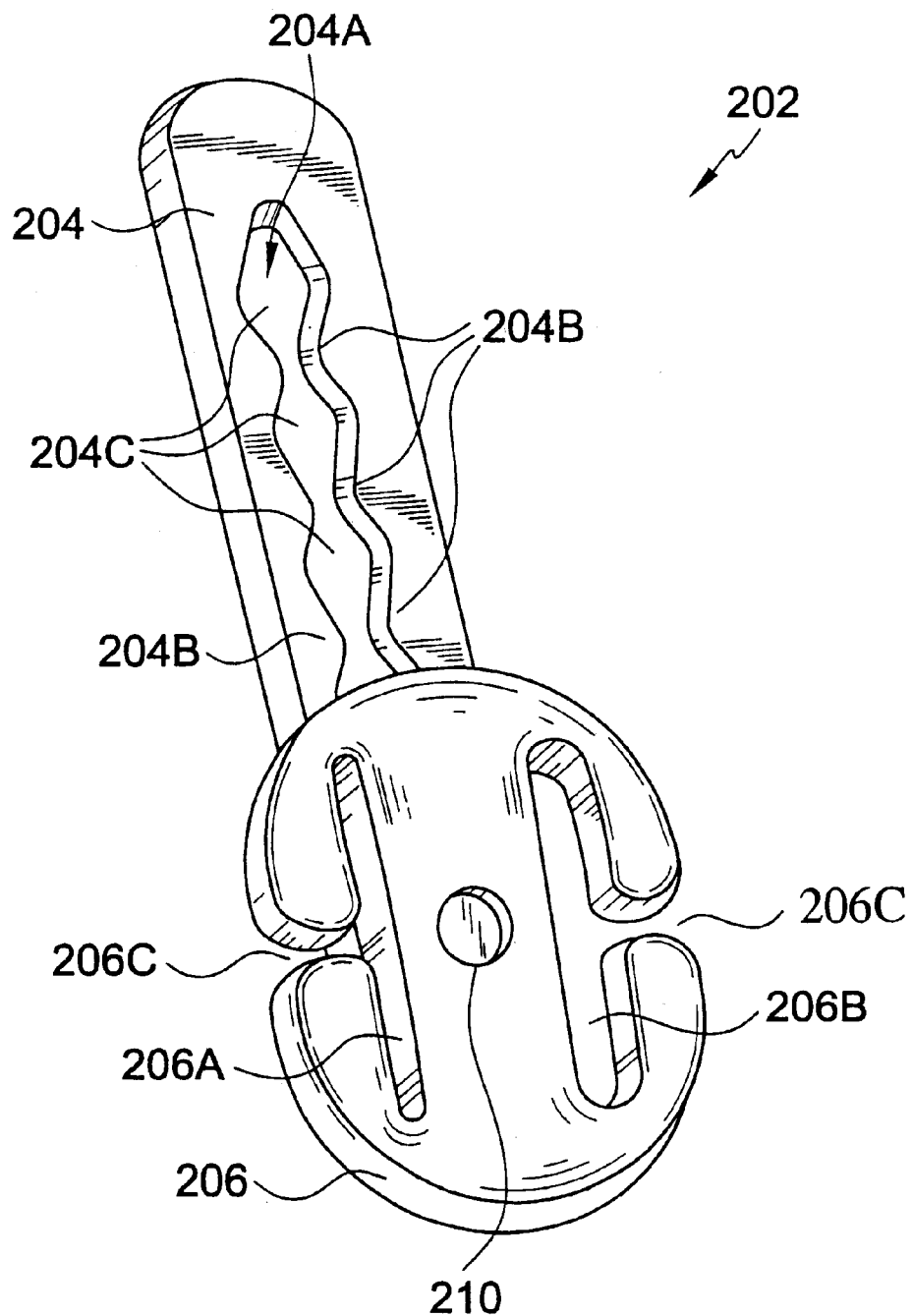
FIG. 5 is a front perspective view of a bracket, provided with a detent position determining structure, and a belt receiving member of the seat belt position adjusting arrangement according to a second embodiment of the invention.
Figure 6:
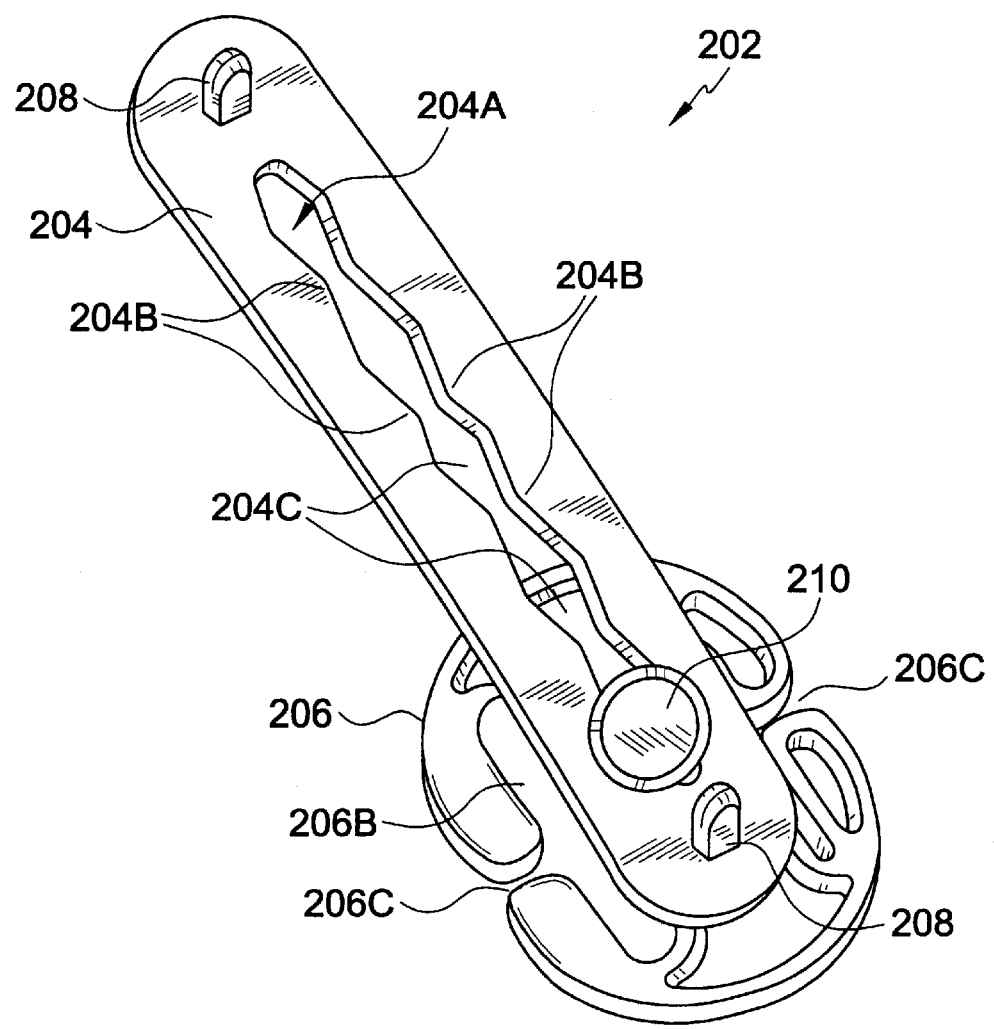
FIG. 6 is a rear perspective view of the second embodiment.

FIGS. 5 and 6 show a second embodiment of the invention. A seat belt position adjusting arrangement 202 includes a mounting bracket 204 and a belt receiving member 206. The belt receiving member 206 has belt slots 206A, 206B and openings 206C for receipt of a shoulder belt. In this embodiment, the mounting bracket 204 is provided with a plurality of spaced, essentially mirror image, detent stops 204B along each side of a shaped guide slot 204A. The detent stops 204B project into the guide slot 204A to create a plurality of spaced positions 204C between each pair of opposed detent stops 204B. The shaft 210 of the belt receiving member 206 can be located and held in a selected one of the spaced positions 204C. The dimensions and shape of the portion of the shaft 210 that passes between the opposed sets of detents 204B is selected with respect to the clearance between the stops 204B and with respect to the flexibility of the material from which the mounting bracket 204 and/or shaft 210 is formed, in a manner that permits the shaft 210 to be manually forced therebetween when a predetermined amount of force is applied to the belt receiving member 206 in the axial direction of the guide slot 204A.

In addition, in this embodiment the shaft 210 can be configured to limit the amount of rotation of the shaft 210 and hence the belt receiving member 206 to about 10°. This can be achieved, for example, by adding one or a pair of suitably sized, shaped, diametrically opposed stops on the periphery of an otherwise circular cross-section shaft so that the shaft will only rotate until the stop contacts the side of slot 204A.

This detent arrangement allows the belt receiving member 206 to be adjustably moved and set in one of a plurality of positions 206C. FIGS. 5 and 6 show five positions 204C and four pairs of opposed detent stops 204B. It will be understood that the mounting bracket 204 can be configured with fewer pairs of opposed detent stops 204B, for example, one pair, and fewer consequent positions 206C, for example, two positions, or with more pairs of opposed detent stops 204B and more consequent positions 206C.

As can be appreciated from the above description, a seat that includes a seat belt position adjusting arrangement of the present invention can quickly and easily be adjusted to accommodate children of various statures, which is advantageous for a child care giver, such as a babysitter, who takes care of several children. In addition, the seat belt position adjusting arrangement of the present invention allows a parent to use the same seat as his or her child grows.

While the present invention finds particularly advantageous application with children's car seats, the invention is not limited to this application and can be applied to child seats placed in planes, boats, trucks, and other vehicles. In addition, the present seat belt position adjusting arrangement can be attached to full size automotive seats, wheelchairs, or full size passenger seats in other vehicles to allow adjustment of a shoulder belt across the torso of a passenger.

A method of adjusting the position of a seat belt across a seat in accordance with the invention includes passing the seat belt through slots formed in a belt receiving member; moving the belt receiving member along a mounting bracket fixed to a frame member of a backrest of the seat; and setting the belt receiving member in a selected one of a plurality of detent positions wherein a belt angle and a belt height meets individual securing requirements. The belt receiving member can be moved by sliding it along an elongate slot in the mounting bracket. In addition, setting the belt receiving member can include rotating the belt receiving member to a predetermined angle with respect to the mounting bracket. According to this method, the belt can be passed through the slots in the belt receiving member before the belt receiving member is moved along the mounting bracket and set in position, or, alternatively, the belt receiving member can be moved along the mounting bracket and set in position before the seat belt is passed through the slots in the belt receiving member.

While the invention has been described with reference to only a limited number of embodiments, the various modifications and changes that can be made without departing from the scope of the present invention, which is limited only by the appended claims, will be self-evident to those skilled in the art to which the present invention pertains or most closely pertains, given the preceding disclosure and the concepts/understanding that can be distilled therefrom.

What is claimed is:

1. A seat belt position adjusting arrangement for a seat having a backrest, comprising:
    a mounting bracket adapted to be fixedly secured to an upper portion of the backrest; and
    a belt receiving member adapted to threadedly receive a shoulder belt, the belt receiving member being operatively connected to the mounting bracket, selectively slidable along the mounting bracket, and locatable in a selected position on the mounting bracket,
    wherein the mounting bracket has a guide slot, and the belt receiving member has a shaft which passes through the guide slot, the shaft being adapted to be rotatable through a predetermined angle with respect to the guide slot and slidable along the guide slot, and
    wherein the belt receiving member is formed with first and second elongate belt slots through which the shoulder belt can be passed, the first belt slot being narrower than the second belt slot, each of the first and second belt slots having an opening via which the shoulder belt can be introduced into the belt slots.

2. A seat belt position adjusting arrangement as set forth in claim 1, further comprising a locating mechanism for locating and holding the shaft in the guide slot in a selected one of a predetermined plurality of spaced positions.

3. A seat belt position adjusting arrangement as set forth in claim 2, wherein the locating mechanism comprises a series of spaced detents which project into the guide slot.

4. A seat belt position adjusting arrangement as set forth in claim 1, further comprising a locating mechanism for locating and holding the shaft in the guide slot in one of a first position and a second position spaced from the first position.

5. A seat belt position adjusting arrangement for a seat having a backrest, comprising:
    a mounting bracket adapted to be fixedly secured to an upper portion of the backrest, the mounting bracket having a guide slot;
    a belt receiving member adapted to threadedly receive a shoulder belt, the belt receiving member having a shaft which passes through the guide slot, the belt receiving member being operatively connected to the mounting bracket, selectively slidable along the mounting bracket, and locatable in a selected position on the mounting bracket; and
    a locating mechanism for locating and holding the shaft in the guide slot in a selected one of a predetermined plurality of spaced positions,
    wherein the shaft is adapted to be rotatable through a predetermined angle with respect to the guide slot and adapted to be slidable along the guide slot, and
    wherein the locating mechanism comprises at least one pair of opposed detents projecting into the guide slot, and the shaft can be locked into place on either side of the pair of detents.

6. A seat belt position adjusting arrangement for a seat having a backrest, comprising:
    a mounting bracket adapted to be fixedly secured to an upper portion of the backrest, the mounting bracket having a guide slot;
    a belt receiving member adapted to threadedly receive a shoulder belt, the belt receiving member having a shaft which passes through the guide slot, the belt receiving member being operatively connected to the mounting bracket, selectively slidable along the mounting bracket, and locatable in a selected position on the mounting bracket; and
    a locating mechanism for locating and holding the shaft in the guide slot in one of a first position and a second position spaced from the first position,
    wherein the shaft is adapted to be rotatable through a predetermined angle with respect to the guide slot and slidable along the guide slot, and
    wherein the locating mechanism comprises a pair of opposed detents projecting into the guide slot.

7. A child's seat for use in a vehicle having at least one shoulder seat belt, comprising:
    a seat portion and a backrest; and
    a seat belt position adjusting arrangement provided on an upper portion of the backrest, the seat belt position adjusting arrangement comprising:
        a mounting bracket fixedly secured to the backrest, the mounting bracket having a guide slot;
        a belt receiving member which is adapted to threadedly receive the shoulder seat belt, the belt receiving member having a shaft which passes through the guide slot, the belt receiving member being operatively connected to the mounting bracket so as to be selectively slidable therealong; and a locating mechanism for locating and holding the shaft in a selected position in the guide slot, wherein the shaft is adapted to be rotatable through a predetermined angle with respect to the guide slot and slidable along the guide slot, and wherein the locating mechanism comprises at least one pair of opposed detents projecting into the guide slot to engage the shaft and resist movement of the shaft therepast until a predetermined amount of force is applied in a direction in which the belt receiving member slides along the mounting bracket.

8. A child's seat as set forth in claim 7, wherein the at least one pair of opposed detents comprises a plurality of pairs of opposed detents, and the pairs of opposed detents sequentially resist movement of the shaft therepast until a predetermined amount of force is applied in a direction in which the belt receiving member slides along the mounting bracket.

9. A seat belt positioning arrangement for a seat having a backrest, comprising:

a mounting bracket adapted to be fixedly secured to an upper portion of the backrest; and a belt receiving member adapted to threadedly receive a shoulder belt, the belt receiving member being operatively connected to the mounting bracket, selectively slidable along the mounting bracket, and locatable in a selected position on the mounting bracket, wherein the mounting bracket has a guide slot, and the belt receiving member has a shaft which passes through the guide slot, the shaft being adapted to be rotatable through a predetermined angle with respect to the guide slot and slidable along the guide slot, and wherein the shaft is configured to have a cross section which limits the amount of rotation of the shaft relative to the slot.

10. A child's seat for use in a vehicle having at least one shoulder seat belt, comprising:

a seat portion and a backrest; and a seat belt position adjusting arrangement provided on an upper portion of the backrest, the seat belt position adjusting arrangement comprising:

a mounting bracket fixedly secured to the backrest; and a belt receiving member which is adapted to threadedly receive the shoulder seat belt, the belt receiving member being operatively connected to the mounting bracket so as to be selectively slidable therealong, wherein the mounting bracket has a guide slot, and the belt receiving member has a shaft which passes through the guide slot, the shaft being adapted to be rotatable through a predetermined angle with respect to the guide slot and slidable along the guide slot, and wherein the shaft is configured to have a cross section which limits the amount of rotation of the shaft relative to the slot.

11. A child's seat as set forth in claim 10, further comprising a locating mechanism for locating and holding the shaft in a selected position in the guide slot.

* * * * *